United States Patent
Franck

(10) Patent No.: US 10,156,070 B2
(45) Date of Patent: Dec. 18, 2018

(54) METHOD FOR PRODUCING A CEILING IN A BUILDING

(71) Applicant: Jan Franck, Weidenberg (DE)

(72) Inventor: Jan Franck, Weidenberg (DE)

( * ) Notice: Subject to any disclaimer, the term of this patent is extended or adjusted under 35 U.S.C. 154(b) by 0 days.

(21) Appl. No.: 15/307,314

(22) PCT Filed: Apr. 28, 2015

(86) PCT No.: PCT/IB2015/000593
§ 371 (c)(1),
(2) Date: Oct. 27, 2016

(87) PCT Pub. No.: WO2015/166331
PCT Pub. Date: Nov. 5, 2015

(65) Prior Publication Data
US 2017/0121971 A1    May 4, 2017

(30) Foreign Application Priority Data

Apr. 28, 2014 (DE) .......... 10 2014 005 992

(51) Int. Cl.
| | |
|---|---|
| *E04B 5/17* | (2006.01) |
| *E04B 9/00* | (2006.01) |
| *E04B 9/36* | (2006.01) |
| *E04G 11/38* | (2006.01) |
| *E04G 11/48* | (2006.01) |
| *E04G 25/04* | (2006.01) |

(Continued)

(52) U.S. Cl.
CPC .............. *E04B 9/001* (2013.01); *E04B 9/006* (2013.01); *E04B 9/10* (2013.01); *E04B 9/22* (2013.01); *E04B 9/36* (2013.01); *E04G 11/38* (2013.01); *E04G 11/48* (2013.01); *E04G 25/04* (2013.01); *E04B 5/48* (2013.01); *E04B 2103/02* (2013.01); *E04B 2103/04* (2013.01)

(58) Field of Classification Search
CPC .......................................................... E04B 5/04
USPC .......................................... 52/748.11, 742.14
See application file for complete search history.

(56) References Cited

U.S. PATENT DOCUMENTS 1,087,644 A * 2/1914 Crane ...................... E04B 5/04
                                                                52/319
3,389,521 A   6/1968 Werner
(Continued)

FOREIGN PATENT DOCUMENTS

| DE | 802352 | 2/1951 |
|---|---|---|
| GB | 610826 | 10/1948 |

*Primary Examiner* — Gisele D Ford
(74) *Attorney, Agent, or Firm* — Pandiscio & Pandiscio

(57) ABSTRACT

The invention relates to a method for producing a ceiling in a building, having the following steps: a) a plate-shaped ceiling element which later remains in the structure, preferably in the form of a ceiling cladding or as a mounting for the ceiling cladding, in particular a dry building panel, is placed and/or fixed on the already completed walls; b) the plate-shaped ceiling element is supported in a closely spaced manner, optionally by means of supported horizontal bars; c) optionally, insulation and/or heating coils and/or an electric installation is placed on the plate-shaped ceiling element; d) a curable compound, for example concrete or prestressed concrete and/or a screed or heating screed or the like, is filled thereon; and e) the support elements are removed after the curable compound has been cured.

14 Claims, 1 Drawing Sheet

(51) Int. Cl.
*E04B 9/10* (2006.01)
*E04B 9/22* (2006.01)
*E04B 5/48* (2006.01)

(56) References Cited

U.S. PATENT DOCUMENTS

| | | | | |
|---|---|---|---|---|
| 4,573,303 | A * | 3/1986 | Figari | E04B 5/263 264/35 |
| 5,794,393 | A * | 8/1998 | Fearn | E02D 27/48 52/169.14 |
| 6,691,470 | B2 * | 2/2004 | Sanger | E04B 5/02 249/19 |
| 6,907,709 | B2 * | 6/2005 | Byrd | C04B 28/02 249/27 |
| 8,245,470 | B2 * | 8/2012 | Bathon | E04B 5/04 52/309.16 |
| 8,297,017 | B2 * | 10/2012 | Platt | E04B 5/04 14/6 |

* cited by examiner

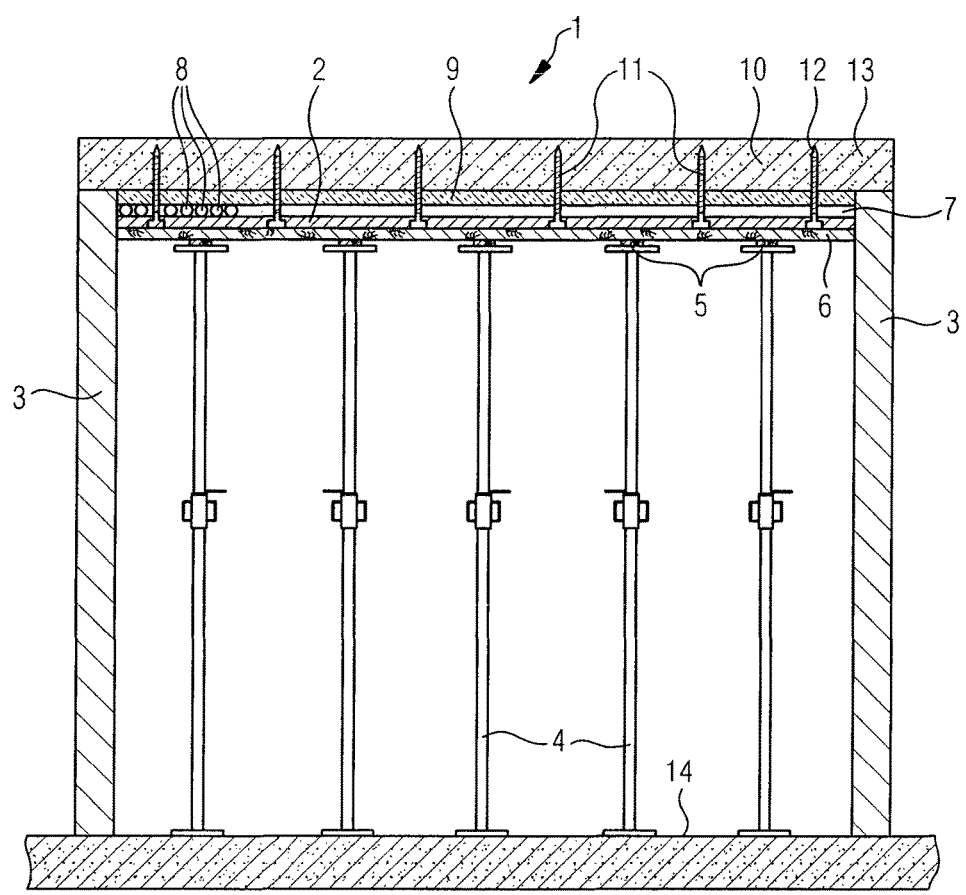

METHOD FOR PRODUCING A CEILING IN A BUILDING

REFERENCE TO PENDING PRIOR PATENT APPLICATIONS

This patent application claims benefit of International (PCT) Patent Application No. PCT/IB2015/000593, filed 28 Apr. 2015 by Jan Franck for METHOD FOR PRODUCING A CEILING IN A BUILDING, which claims benefit of German Patent Application No. DE 10 2014 005 992.8, filed 28 Apr. 2014, which patent applications are hereby incorporated herein by reference.

FIELD OF THE INVENTION

The invention is directed to a method for producing a ceiling in a building.

BACKGROUND OF THE INVENTION

Typically, when building a ceiling in a building, firstly supporting horizontal bars are laid; they are then cladded on the upper and lower side thereof, which is very labor-intensive.

Furthermore, there is the possibility of using finished concrete plates and laying them on the already existing walls. However, the lower side thereof generally does not appear very accommodating, and therefore also has to be cladded.

A further building variant also suffers in this regard, wherein firstly thinner concrete plates are laid on the wall upper edges and are then filled up on the upper side thereof with in situ concrete. The chamfered edges of the concrete plates are also clearly visible here on the lower sides, and these therefore either have to be cladded or grouted.

SUMMARY OF THE INVENTION

The problem which initiates the invention, which results from the disadvantages of the described prior art, is that of refining a ceiling structure of a building such that it can be produced with the least effort and nonetheless meets extremely high aesthetic demands.

This problem is solved by a method for producing a ceiling in a building, having the following steps:
a) a plate-shaped ceiling element, for example, a dry building panel, is placed and/or fixed on the already completed walls;
b) the plate-shaped ceiling element is supported in a closely spaced manner, optionally by means of supported horizontal bars;
c) optionally, insulation and/or heating coils and/or an electric installation is placed on the plate-shaped ceiling element;
d) a curable compound, for example, concrete or prestressed concrete and/or a screed or heating screed or the like, is filled thereon; and
e) the support elements are removed after the curable compound has been cured.

In that this ceiling structure is consequently built from bottom to top, it may be finished in a single, chronological sequence of work steps. In this case, the ceiling cladding, which begins lowermost, can remain on the lower side if it is sufficiently anchored in the cured compound or is connected thereto. This may be performed, for example, in that upwardly protruding screws or other fastening means are inserted into the ceiling cladding.

An insulation and/or the respective required installation is then placed on this cladding, for example, electric cables, lights, possibly heating coils, or the like.

The actual supporting layer then follows thereon, in particular by pouring on a liquid compound made of concrete or the like.

A separate screed can be layered thereon, optionally after an insulation layer in between. Under certain circumstances, such a double layer made of concrete and screed can be omitted, for example, if an insulation layer is inlaid between the lower side of the cured compound and the lower-side cladding, in particular in the form of an XPS insulation or a comparable stable insulation.

It has proven to be advantageous for the plate-shaped ceiling element to be aligned such that its upper side or the upper side of the uppermost insulation, heating coils, and/or electric installation located thereon is in a common alignment and/or horizontal plane with the upper sides of the adjoining walls. Accordingly, a supporting plate formed by a curing compound applied thereon can be supported directly on the upper edges of the surrounding walls, if it is dimensioned appropriately large, i.e., such that the footprint of the supporting plate is greater than the footprint of the spanned space.

The use of wood has proven itself for the plate-shaped ceiling element, for example, in the form of a wooden plate, a plywood plate, a particleboard plate, a laminated wood plate, a moderate-density fiberboard plate, or an oriented strand board plate, but preferably a medium hardness fiberboard plate or a hard fiberboard plate. Such plates can securely support a curing compound loading thereon, on the one hand, until it has cured to form a plate; in addition, in the finished state of the ceiling, they form a workable lower side, which facilitates the mounting of further elements, for example, curtain rails, for which no pegs are then necessary, in contrast to a concrete ceiling.

The invention recommends that the plate-shaped ceiling element be penetrated by a plurality of preferably elongated anchoring parts, which extend upward from the ceiling element of into the curable compound. These anchoring parts are obliged in particular to still hold the plate-shaped ceiling element in position after finishing of the ceiling and removal of the lower-side support elements.

The invention may be refined in that the anchoring parts have a form such that, after the solidification of the curable compound, they are fixed therein in a formfitting manner, in particular in relation to vertical tensile stresses. In that a compound flows around them, which engages under radially protruding regions of an anchoring parts such as a thread, an immediate form fit results.

Further advantages result in that the anchoring parts, after the solidification of the curable compound, are removably fixed therein, in particular in the form of screws, which can be unscrewed by rotational movements from the compound, which has solidified into a supporting layer. The advantage is that screws can be removed if needed in such a case, so that the plate-shaped cover element can be removed, for example, to replace it or to obtain access to installation elements concealed behind it, for example, a ceiling heater.

The anchoring parts can have a coating which prevents sticking to the cured compound, for example, a thinly applied oil. In such a case, a screw does form its chuck in the cured compound itself, but does not stick therein, but rather can subsequently be unscrewed. The thread remains in the supporting plate and can be used at any time for screwing in the screw again.

The invention recommends reinforcing the curable compound, in particular by way of inlaid iron or steel mats or cages, so that the load capacity of a finished cured, supporting plate is increased further.

Because the curable compound is also applied to the upper sides of the adjacent walls, the supporting plate resulting after the curing thereof rests on the walls, so that loading weight forces are introduced directly into the adjoining walls.

After curing of the supporting layer, the lower-side supports can be removed, and the ceiling is finished. The lower-side connecting plates are held extremely strongly on the ceiling thanks to the upwardly protruding screws thereof, which are enclosed directly in the concrete, but can also be removed at any time by unscrewing the screws. If this was not previously performed, after the removal of the support elements, a ceiling cladding can be mounted by anchoring in the plate-shaped ceiling element, for example, a wooden ceiling made of profiled boards.

BRIEF DESCRIPTION OF THE DRAWINGS

Further features, details, advantages, and effects on the basis of the invention result from the following description of a preferred embodiment of the invention and on the basis of the drawing.

FIG. 1 shows a vertical section through a ceiling structure according to the invention during the production thereof.

DETAILED DESCRIPTION OF THE PREFERRED EMBODIMENTS

A ceiling 1 according to the invention is built by means of a plate-shaped ceiling element 2 on already existing walls 3, which support the ceiling 1 after completion of the structure.

Plates made of wood, for example, plywood plates such as veneer plywood plates, blockboard or laminboard plates or laminated timber plates, also called cross-laminated timber plates; furthermore chipboard plates, in particular oriented strand board plates; and also fiberboard plates, for example, hard fiberboard plates or moderate-density fiberboard plates, have therefore proven themselves as the plate-shaped ceiling element 2 in particular. All of these plates share the feature that the wood does not consist of a single, unprocessed raw wood layer, but rather receives completely omnidirectional properties as much as possible and therefore hardly still works, as a result of a combination of many small wood elements with various fiber directions and/or as a result of a binder which connects the individual components to one another. In addition, such plates have a comparatively high mechanical stability with reasonable price at the same time.

The plate-shaped ceiling element 2 is to completely span the relevant room at least in one spatial direction if possible. For the period of time of the ceiling mounting, it can be fixed on the walls 3, for example, by means of metal angles, which advantageously protrude upward from the plate-shaped ceiling element 2 and therefore are not visible from below.

The precise height of the ceiling element 2 is oriented, on the one hand, according to the desired room height, but, on the other hand, also according to the desired ceiling structure and not least according to the height of the walls 3. This will be discussed in greater detail hereafter.

To support the weight of the individual components, which are not yet joined together, during the ceiling installation, an array of structural support elements 4 is set up between the walls 3. Horizontally extending bars 5 rest thereon, and alternately the plate-shaped ceiling element 2 can be placed thereon and/or further cladding plates 6, for example, dry building panels such as plasterboard plates or the like, which are or will be connected to the plate-shaped ceiling element. Of course, an installation of cladding plates 6 can also be superfluous, for example, if the plate-shaped ceiling element 2 is only to be wallpapered, or can also only be performed after finishing the ceiling 1 according to the invention.

A layer 7 made of a solid insulation can be placed on top thereon, for example, a thermal insulation such as XPS. Installations can be performed in this layer 7 or thereon, for example, electric cable can be placed or ceiling lights can be integrated. Heating pipes 8 can optionally be placed on this insulation layer 7, for example, for a ceiling heater. In the case of a ceiling heater, heating pipes or coils 8 can be covered by a further insulation layer 9.

The actual, supporting layer 10 is then produced.

The connection of the plate-shaped ceiling elements 2 having the supporting layer 10 is performed by means of elongated anchoring parts, for example, in the form of screws 11, in particular wood screws, the heads of which are each enclosed in a plate-shaped ceiling element 2 on the lower side thereof or are accommodated in depressions therein. The free shaft ends 12 of these screws 11 point upward in this case during the installation, as is recognizable in the drawing.

To avoid sticking of the curing supporting layer to the elongated anchoring parts or screws 11, they can be provided with an anti-stick layer, for example, they can be thinly sprayed with oil.

Before the application of the actual supporting layer 10, in a next work step, rebar or other reinforcement material can be laid on the already finished ceiling substructure, optionally by means of spacers, so that the compound flows completely around the rebar and it cannot rust.

As the next step, liquid concrete or another curable compound 13 is poured onto the ceiling substructure finished up to this point and optionally shaken or compacted and/or smoothed.

The further floor structure above the supporting layer 13 is oriented to the conditions of the specific case and/or the desires of the developer. An integration of a floor heater is possible, as is the placement of electric cables or other pipes and lines.

If the supporting layer 13 has been cured, the lower-side structural supports 4 can be removed. If this has been performed, a smooth ceiling lower side is obtained. The butt joints between the dry building panels only still have to have adhesive tapes stuck over them and therefore be closed; the lower side can then be wallpapered or immediately painted.

A cladding 6 is shown below the plate-shaped ceiling element 2 in the drawing. The cladding can, of course, as in the drawing, previously be applied to the lower side of the plate-shaped ceiling element, optionally also in horizontal construction, wherein the plate-shaped ceiling element 2 thus rests with its lower side on top on the bottom 14 of the relevant room or on another planar underlay, so that the profiled boards 6 can be placed on the plate-shaped ceiling element, as is typical when placing floorboards.

Of course, the cladding of the ceiling 1 can also be performed only after the finishing thereof.

Finally, it is also to be noted that for static reasons, the supporting layer 10 is to be seated directly on the walls 3, so that weight forces are introduced completely into the walls 3. For this purpose, the plate-shaped ceiling elements are advantageously to be fixed at a height on the walls 3 so that the upper edge of the ceiling structure between the plate-shaped ceiling element 2 and the supporting layer 13 corresponds as exactly as possible to the upper edge of the adjoining walls 3, so that the supporting cover plate 10, which is concreted on location, is seated with as little offset as possible directly on the walls 3. In the case of a ceiling heater or installations 8 below the supporting layer 10 or a thermal insulation 7, 9 between the plate-shaped ceiling element 2 and the supporting ceiling plate 10, the plate-shaped ceiling elements 2 are therefore to be fixed on the walls offset downward by a corresponding amount in relation to the upper edge of the walls 3.

The structure according to the invention has the advantage, inter alia, that installations of a manifold nature can be performed below the supporting cover plate 10, in particular also in the form of a ceiling heater, which can be mounted with little effort and are fundamentally accessible later for maintenance and repair purposes by unscrewing the plate-shaped ceiling element 2, in contrast, for example, to a conventional floor heater, the heating coils of which are generally no longer accessible without destroying the screed.

LIST OF REFERENCE NUMERALS 1 ceiling
2 plate-shaped ceiling element
3 wall
4 support element
5 horizontal bars
6 cladding plate
7 insulation layer
8 heating coil
9 insulation layer
10 supporting layer
11 screw
12 free shaft end
13 curable compound
14 floor

The invention claimed is:

1. A method for producing a ceiling in a building having at least two walls that are spaced apart by a gap, the at least two walls each comprising two side surfaces and a top end surface, the method comprising the following steps:
  a) fixing a plate-shaped ceiling element comprising an upper surface and a lower surface to the at least two walls of the building such that the plate-shaped ceiling element spans the gap between the at least two walls, with the plate-shaped ceiling element being supported in a closely space manner in the gap between the at least two walls by one or more support elements contracting the lower surface of the plate-shaped ceiling element;
  b) flowing a curable compound in the form of concrete or prestressed concrete or a screed or heating screed, such that the curable compound contacts the upper surface of the plate-shaped ceiling element and extends at least partially above the at least two walls so as to contact the top end surface of each of the at least two walls; and
  c) providing a plurality of elongated anchoring parts, which extend from the lower surface of the plate-shaped ceiling element through the upper surface of the plate-shaped ceiling element and into the curable compound, such that, after the solidification of the curable compound, the plurality of elongated anchoring parts are detachably fixed therein, wherein each of the plurality of elongated anchoring parts can be removed from the solidified curable compound by selectively rotating the elongated anchoring part; and
  d) removing the one or more support elements after the curable compound has been cured to form a supporting layer.

2. The method according to claim 1, characterized in that the plate-shaped ceiling element is aligned such that the top ends of the at least two walls are in common alignment or in a common horizontal plane with the top surface of the plate-shaped ceiling element.

3. The method according to claim 1, wherein the plate-shaped ceiling element comprises at least one selected from the group consisting of wood, a wooden plate, a plywood plate, a particleboard plate, a laminated wood plate, a medium-density fiberboard plate, an oriented strand board plate, and a high-density fiberboard plate.

4. The method according to claim 1, characterized in that each of the plurality of elongated anchoring parts comprises a screw.

5. The method according to claim 1, characterized in that the plurality of elongated anchoring parts have a form such that, after the solidification of the curable compound they are fixed therein in a positive-locking manner, in such way that the fixation resists vertical stresses.

6. The method according to claim 4, characterized in that the plurality of elongated anchoring parts have a coating which prevents sticking to the curable compound.

7. The method according to claim 1, characterized in that the curable compound is reinforced, in particular by inlaid iron or steel mats or cages.

8. The method according to claim 1, characterized in that, after the removal of the support elements, a ceiling cladding is mounted to the lower surface of the plate-shaped ceiling element.

9. The method according to claim 1 wherein, prior to flowing the curable compound a intra-ceiling element comprising an upper surface and a lower surface is installed on the upper surface of the plate-shaped ceiling element such that the lower surface of the intra-ceiling element faces the upper surface of the plate-shaped ceiling element.

10. The method according to claim 9 wherein the intra-ceiling element comprises at least one selected from the group consisting of insulation, heating coils, and electric installation.

11. The method according to claim 9 wherein the upper surface of the intra-ceiling element is aligned such that the top ends of the at least two walls are in a common alignment or in a common horizontal plane with the upper surface of the intra-ceiling element.

12. The method according to claim 6 wherein the coating comprises a thinly applied oil.

13. The method according to claim 8 wherein the cladding comprises a wooden ceiling made of profiled boards.

14. A method for producing a ceiling in a building having at least two walls that are spaced apart by a gap, the at least two walls each comprising two side surfaces and a top end surface, the method comprising the following steps:
  a) fixing a plate-shaped ceiling element comprising an upper surface and a lower surface to the at least two walls of the building such that the plate-shaped ceiling element spans the gap between the at least two walls, with the plate-shaped ceiling element being supported in a closely spaced manner in the gap between the at least two walls by one or more support elements contacting the lower surface of the plate-shaped ceiling element;

b) flowing a curable compound in the form of concrete or prestressed concrete or a screed or heating screed, such that the curable compound contacts the upper surface of the plate-shaped ceiling element and extends at least partially above the at least two walls so as to contact the top end surface of each of the at least two walls; and c) providing a plurality of elongated screws, which extend from the lower surface of the plate-shaped ceiling element through the upper surface of the plate-shaped ceiling element and into the curable compound, such that, after the solidification of the curable compound, the plurality of elongated screws are detachably fixed therein, wherein each of the plurality of elongated screws can be removed from the solidified curable compound by selectively rotating the elongated screws; and d) removing the one or more support elements after the curable compound has been cured to form a supporting layer.

* * * * *